Sept. 1, 1942.　　　M. ZAWISTOWSKI　　　2,294,497
PORTABLE CUTTING MACHINE
Filed June 19, 1942　　　2 Sheets-Sheet 1
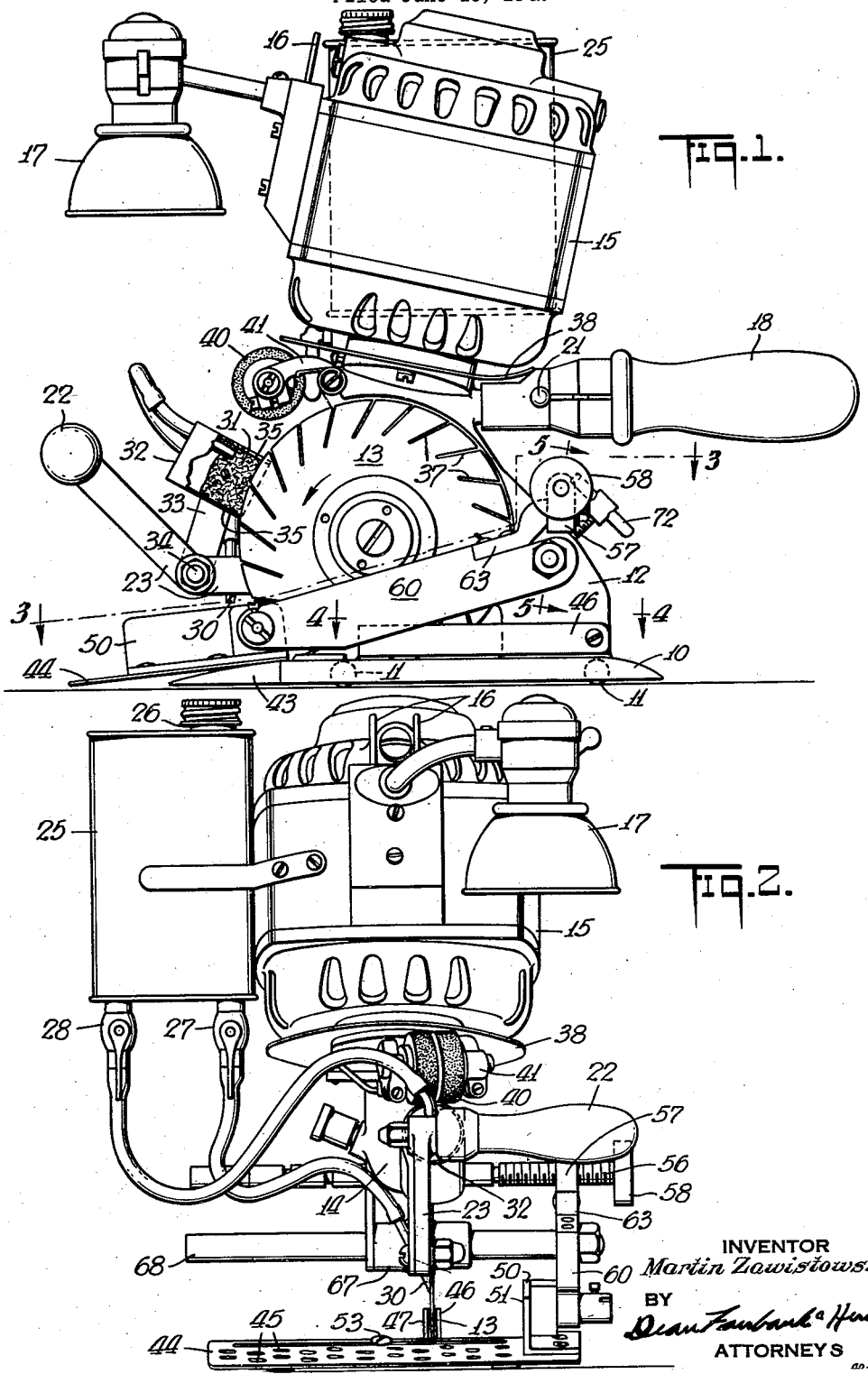

Sept. 1, 1942.  M. ZAWISTOWSKI  2,294,497
PORTABLE CUTTING MACHINE
Filed June 19, 1942   2 Sheets-Sheet 2
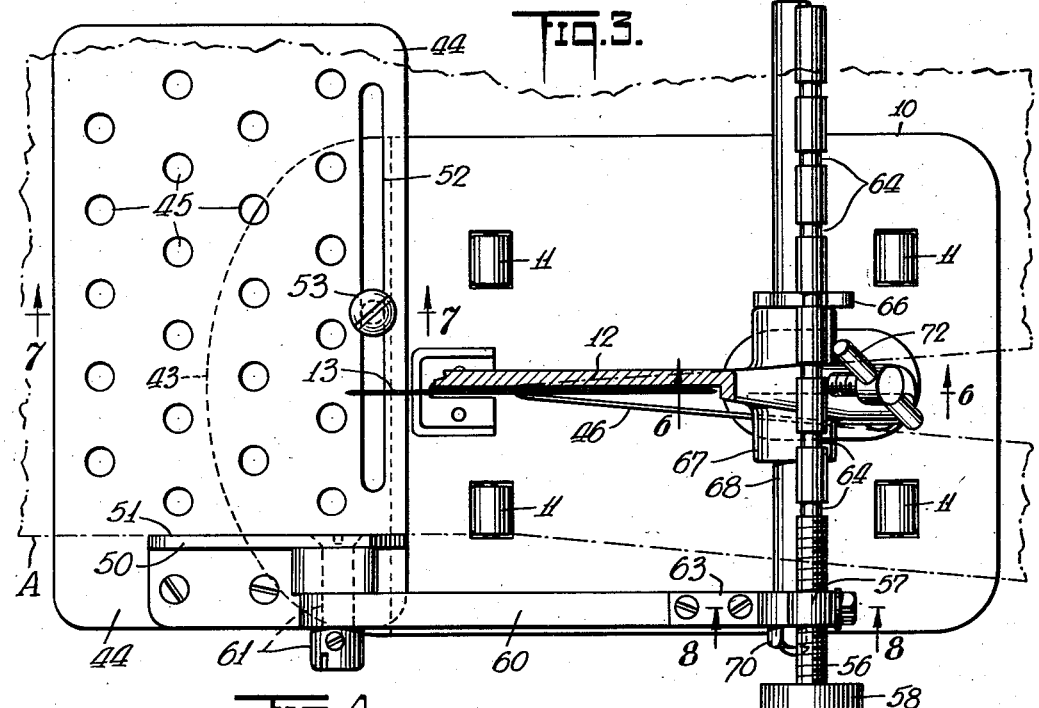
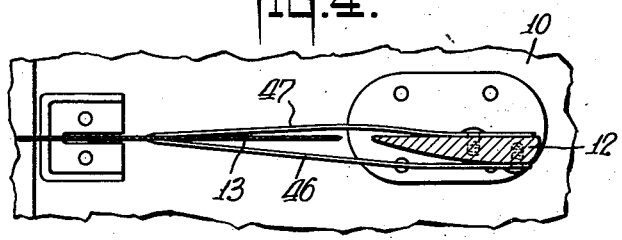
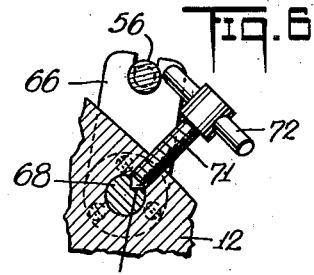
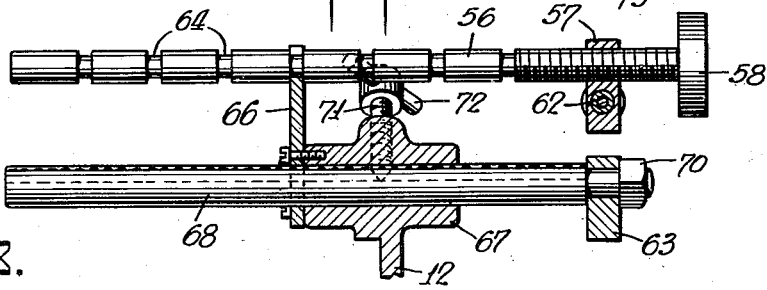
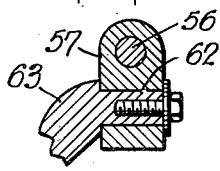
INVENTOR
*Martin Zawistowski*
BY
*Dean Fairbank & Hirsch*
ATTORNEYS Patented Sept. 1, 1942

2,294,497

UNITED STATES PATENT OFFICE 2,294,497

PORTABLE CUTTING MACHINE

Martin Zawistowski, Huntington, N. Y.

Application June 19, 1942, Serial No. 447,612

17 Claims. (Cl. 30—273)

The present invention relates to portable machines for cutting sheet material such as rubber into sections or strips of desired widths or thicknesses.

One object of the present invention is to provide means for accurately and speedily adjusting machines of the character described to cut sheet material into sections or strips of desired widths or thicknesses.

Another object is to provide a rotary cutting knife constructed to increase those areas thereof which come in contact with the cooling liquid, whereby said knife is more effectively cooled during cutting action.

In carrying out certain features of the present invention, the cutting machine has a gauge surface spaced from the cutting plane of the knife and adapted to slide along one edge of the sheet material during cutting operations to predetermine the width or thickness of the cut strip and to maintain the plane of severance parallel to this edge. This gauge surface is movable by hand towards and away from the knife for rough adjustments, and is movable by means of a feed screw for fine adjustments.

As another feature, the knife has a series of slots spaced along its periphery and extending inwardly to present increased areas to the cooling medium.

Various other objects, features and advantages of the invention will be apparent from the following particular description, and from an inspection of the accompanying drawings, in which Fig. 1 is a side elevation of a cutting machine having a gauge adjusting mechanism embodying the present invention;

Fig. 2 is a front elevation of the machine shown in Fig. 1;

Figs. 3, 4 and 5 are sections taken on lines 3—3, 4—4 and 5—5 of Fig. 1 respectively; and Figs. 6, 7 and 8 are sections taken on lines 6—6, 7—7 and 8—8 of Fig. 3 respectively.

Referring to the drawings, the features of the present invention are shown as an example applied to a portable cutting machine of the type comprising a base 10 having a series of rollers 11 by which the machine can be easily moved along a table supporting the sheet material to be cut. Fixed to this base 10 is a stand 12 serving as a journal support for a rotary knife 13, and also serving to support a motor 15 which drives said knife through a suitable transmission enclosed in a casing 14 connected to or forming part of the stand 12. A plug 16 mounted on the motor frame is adapted to be connected to the ordinary electric cord to supply current to the motor 15, and also to a lamp 17 by which the cutting area can be illuminated. A handle 18 is secured to the rear of the stand 12 and carries a motor switch 21 easily accessible for operation from the thumb of the hand holding said handle. A second handle 22 in front of the machine is made rigid with the stand 12 through an angle arm 23 connected to or forming an extension of said stand.

The knife 13 is supplied with lubricating or cooling liquid such as water from a tank 25 connected to the motor frame and having a filling opening 26 at the top and a pair of valved outlets 27, 28 at the bottom. One of these outlets 27 is connected by a hose to a nozzle 30 fixed to the frame arm 23, and adapted to project the lubricating liquid against the edge of the knife 13 near the cutting field. The other outlet 28 is connected by a hose to a sponge 31 retained in a cup 32 supported on one end of an arm 33, the other end of which is attached to the apex section of the frame arm 23 by a pivot connection 34 which permits said cup to be angularly adjusted with respect to the knife 13. Diametrical slots 35 in the cup 32 permit said cup to be straddled over the cutting edge of the knife with the sponge 31 embracing the sides and edge of said knife for effective lubrication.

The knife 13 has a series of slots 37 extending inwardly from its cutting edge to assist in the proper cooling of the knife through the action of the cooling liquid applied to said knife. These slots 37 are desirably inclined in the direction of rotation of the knife with respect to the corresponding radial lines extending to the outer ends of respective slots.

A plate 38 secured to the stand 12 directly below the motor 15 prevents the lubricant applied to the knife 13 from splashing into the motor casing.

A knife sharpening wheel 40 is journalled in a lever arm 41, and is spring retained in inoperative position shown in Figs. 1 and 2 away from the knife 13. A link system (not shown) operated from a finger piece (not shown) at the handle 18 permits the swinging of the wheel 40 towards the knife 13 into sharpening position.

The machine base 10 has a forward tapering section 43 on which rests an inclined plate 44 serving as a ramp for the material A to be cut during the movement of the machine along the supporting table. This inclined plate 44 is desirably provided with a series of holes 45 to reduce to a minimum the friction between said plate and the material to be cut.

A pair of spreaders 46 and 47 in the form of leaf springs on opposite sides of the knife 13 have one end fixed to the stand 12 and slant from said end towards said knife with their outer free ends close to the corresponding faces of said knife. One of said spreaders 46 on the same side of the knife 13 as the smaller cut section, has a greater slant than the other spreader 47, since the width of this section is sufficiently small to permit it to be easily deflected away from the plane of the knife, while on the other side of the knife the spreader 47 is slanted just sufficiently to yieldably press the cut edge of the main part of the sheet material out of contact with the rotary knife 13. With this arrangement, the friction between the sheet material being cut and the knife 13 is reduced to a minimum.

The knife slots 37 extend in such a direction as to pass between the free ends of the spreaders 46 and 47 at an angle to said free ends, thereby eliminating the possibility of these slots catching at these free ends.

As a feature of the present invention, the inclined plate 44 carries near one side a gauge 50 presenting a vertical gauge surface 51 adapted to engage and slide along the edge of the sheet material A to be cut as the machine is moved along said material, so that the width or thickness of the section or strip being cut is predetermined. The plate 44 is movable transversely of the cutting plane of the knife 13 to permit adjustments in the position of the gauge 50. To guide the plate 44 during its adjusting movement, said plate has an elongated slot 52 through which passes a screw 53 threaded into the base section 43.

After loosening the screw 53, the plate 44 may be manually pushed to roughly adjust the position of the gauge 50. To accurately adjust the gauge 50 after its approximate adjustment has been made, there is mounted behind and transversely of the knife 13 a screw spindle 56, which is threaded in a nut 57 movable with the gauge 50 and which terminates at one end in a turning knob 58. The connection between the nut 57 and the gauge 50 comprises an arm 60 fixed at one end to said gauge by any suitable means, as for instance a bolt connection 61, and carrying at its other end the nut 57.

The screw spindle 56 is held against endwise movement during rotation thereof to effect axial movement of the nut 57, and in turn fine adjusting movement of the gauge 50 towards or away from the cutting plane of the knife 13, and is readily movable out of operative position to release the gauge 50 and thereby permit speedy adjustments in the approximate position of said gauge. For that purpose, the nut 57 is supported on a pivot pin 62 connected to or forming an extension of a bracket 63 fixed to the rear end of the arm 60. The axis of this pivot pin 62 extends at right angles to the axis of the thread hole of the nut 57, so that the screw spindle 56 may be angularly raised into inoperative position about the axis of said pivot pin or angularly lowered into horizontal operative position shown in Figs. 1, 2, 3 and 5. To hold the spindle 56 against endwise movement while in horizontal operative position, said spindle is formed with a series of spaced annular recesses 64 into which extends the upper clevis end of a locking plate 66, the other lower end being connected or otherwise rigid with a fixed frame member 67. This frame member 67 forms an extension of or is otherwise connected to the stand 12, and serves as a slide bearing for a rod 68, one end of which is suitably affixed to the bracket 63, as for instance by a screw and nut connection 70. This rod 68 is clamped against endwise movement and the gauge 50 correspondingly held in adjusted position by means of a set screw 71 threaded in the slide bearing 67, and terminating at one end in a suitable turning handle 72. The rod 68 is provided with a V-slot 73 extending lengthwise thereof and adapted to receive the conical bearing end of the set screw 71 for the clamping of said rod against endwise movement.

When it is desired to adjust the position of the gauge 50, the screw 53 is loosened, and the set screw 71 is turned so that it does not bear against the rod 68. The screw spindle 56 is then angularly raised about the pivot pin 62 and out of locking engagement with the locking plate 66, and the gauge 50 moved manually into the approximate position desired for the next cutting operation. This adjusting movement of the gauge 50 will cause the plate 44 to slide along the screw 53, the released rod 68 to slide through fixed bearing 67, and the nut 57 carrying the spindle 56 to move with said rod and said gauge. The gauge 50 is manually pushed or pulled into approximate desired position with the nearest recess 64 on the screw spindle 56 corresponding to that position directly above the clevis end of the locking plate 66. With the gauge 50 in this position, the screw spindle 56 is angularly lowered so that the clevis upper end of the plate 66 fits into this nearest recess 64 as shown in Fig. 5, and said spindle locked against endwise movement. The fine accurate adjustment in the position of the gauge 50 is then effected through the turning of the spindle 56. Since the spindle 56 is held by the locking plate 66 against endwise movement, turning of the spindle will cause the movement of the nut 57 axially along the spindle, and since the rod 68 is released and free to move endwise, this movement of the nut 57 causes the corresponding movement of the gauge 50 and of the plate 44. When the gauge 50 has reached the desired adjusted position, the set screw 71 is turned to bear on the rod 68, and the screw 53 clamped down on the plate 44. This locks the gauge 50 in the set position.

As many changes can be made in the above apparatus, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. A portable machine for cutting strips of comparatively thick sheet material such as rubber comprising a knife, a gauge movable with respect to the cutting plane of said knife for predetermining the width of the sections or strips cut, screw means for effecting fine adjustments in the position of said gauge with respect to said plane, and means for rendering said screw means inoperative to permit manual adjusting movement of said gauge.

2. A portable machine for cutting sheet material such as rubber, comprising a knife, a gauge having a gauge surface parallel to the cutting plane of said knife, and adapted to engage the edge of the material to be cut during cutting operations, said gauge being manually movable into approximately the desired adjusted position with respect to said plane, and threaded means for effecting fine accurate adjustments in the position of said gauge with respect to said plane after said gauge has been manually moved in approximate adjusted position.

3. A portable machine for cutting sheet material such as rubber comprising a knife, a gauge movable with respect to the cutting plane of said knife for predetermining the width of the sections cut, a rotary member for adjusting said gauge with respect to said plane, and means for rendering said rotary member inoperative to permit said gauge to be pushed or pulled into approximately adjusted position with respect to said plane.

4. A portable machine for cutting sheet material such as rubber comprising a knife, a gauge movable with respect to the cutting plane of said knife for predetermining the width of the sections cut, a screw member, a nut member on said screw member, means holding one of said members against axial movement to move the other member axially upon rotating of said screw member, means holding said gauge and said other member for movement in unison, whereby upon axial movement of said latter member, said gauge will be adjusted with respect to said plane, and means for releasing one of said holding means to permit said gauge to be manually adjusted with respect to said plane independently of said screw.

5. A portable machine for cutting sheet material such as rubber comprising a knife, a gauge movable with respect to the cutting plane of said knife for predetermining the width of the sections cut, a screw, releasable means for holding said screw against axial movement while said screw is rotated, a nut on said screw moved axially along said screw as said screw is turned, and means connecting said gauge and said nut for adjusting movement together with respect to said cutting plane, said gauge being adjustable manually independently of said screw upon release of said holding means.

6. A portable machine for cutting sheet material such as rubber into sections comprising a knife, a ramp plate leading to the cutting field of said knife and movable transversely of the cutting plane of said knife, a gauge connected to said plate on one side of said cutting plane and having a gauge surface substantially parallel to said cutting plane, and adapted to engage the edge of the material to be cut during cutting operations, and screw means for adjustably moving said gauge and said ramp plate with respect to said cutting plane.

7. A portable machine for cutting sheet material such as rubber comprising a base, a frame structure on said base, a rotary knife carried by said base, a ramp plate in front of said knife leading to the cutting field of said knife and slidable over said base transversely of the cutting plane of said knife, a gauge secured to said plate and adapted to engage the edge of the material to be cut during cutting operations for predetermining the thickness or width of the sections or strips cut, means for locking said ramp plate to said base in adjusted position in front of said knife, and means in the rear of said knife for locking said gauge to said frame in adjusted position.

8. A portable machine for cutting sheet material such as rubber into sections comprising a knife, a gauge mounted on one side of the cutting plane of said knife, and movable transversely of said plane, said gauge having a gauge surface substantially parallel to said plane and adapted to engage the edge of the material to be cut during cutting operations, said gauge surface extending in front of said knife, a screw spindle extending transversely of said cutting plane and to the rear of said knife and means operable upon rotation of said screw spindle for effecting the adjusting movement of said gauge relative to said plane.

9. A portable machine for cutting sheet material such as rubber comprising a knife, a gauge adjustable towards or away from the cutting plane of said knife and predetermining the width of the sections cut according to the distance of said gauge from said plane, a pivotally supported screw spindle, means for adjusting the position of said gauge with respect to said plane upon rotation of said spindle and means operable upon pivotal movement of said spindle for rendering said adjusting means inoperative, whereby said gauge is free to be adjustably moved manually with respect to said plane independently of said spindle.

10. A portable machine for cutting sheet material such as rubber into sections or strips comprising a knife, a gauge movable towards and from the cutting plane of said knife, and predetermining the width of the sections cut according to the distance of said gauge from said plane, a screw spindle, a pivotally supported nut movable along said spindle upon rotation of said spindle, means for holding said spindle against endwise movement, said means being released by the angular movement of said spindle about the pivotal support of said nut, and means connecting said nut and said gauge for adjusting movement in unison, said gauge being adjustably movable with respect to said plane independently of said screw spindle upon release of said holding means.

11. A portable machine for cutting sheet material into sections or strips comprising a knife, a gauge on one side of said knife for predetermining the width of the sections cut, a screw spindle, a nut on said spindle movable therealong upon rotation of said spindle, means for locking said spindle against endwise movement comprising a series of locking conformations spaced along said spindle, and a locking member adapted to engage any one of said conformations, means for releasing said locking means, and means connecting said nut and said gauge for adjusting movement together upon rotation of said spindle, said gauge being adjusted manually independently of said screw spindle upon the release of said locking means.

12. A portable machine for cutting sheet material into sections or strips comprising a knife, a gauge on one side of said knife for predetermining the width of the sections cut, a spindle having a portion of its length threaded and another portion provided with a series of spaced annular recesses, a nut on the threaded portion of said spindle movable therealong upon rotation of said spindle, a locking plate having a clevis portion adapted to extend into any one of said recesses and lock said spindle against endwise movement while permitting said spindle to be rotated, means for releasing said spindle against the locking action of said plate, and means connecting said nut and said gauge for adjusting movement together upon rotation of said spindle, said gauge being adjusted manually independently of said spindle upon the release of said locking plate from engagement with said spindle.

13. A portable machine for cutting sheet material into sections or strips comprising a knife, a gauge on one side of said knife for predetermining the width of the sections cut, a screw spindle, a pivotally supported nut on said spindle movable therealong upon rotation of said spindle, means for locking said spindle against endwise movement comprising a series of locking conformations spaced along said spindle, and a fixed locking plate adapted to engage any one of said conformations, said spindle being released from said locking plate by angularly moving said spindle about the pivotal support of said nut and out of locking engagement with said plate, whereby said gauge may be adjusted manually independently of said screw spindle, and means connecting said nut and said gauge for adjusting movement together upon rotation of said spindle.

14. A portable machine for cutting sheet material such as rubber into sections or strips comprising a knife, a gauge movable with respect to the cutting plane of said knife for predetermining the width of the sections cut, a screw, releasable means for holding said screw against axial movement while said screw is rotated, a nut on said screw moved axially along said screw as said screw is turned, a connecting member between said gauge and said nut for effecting movement of said gauge and said nut in unison with respect to said cutting plane, a fixed slide bearing, a slide rod passing through said bearing and connected to said connecting member, said rod being parallel to said screw in operative position of said screw, and releasable means for holding said slide rod against endwise movement, said gauge being adjustable manually independently of said screw upon release of the means holding said screw against axial movement.

15. A portable machine for cutting sheet material into sections or strips comprising a rotary knife, a gauge mounted on one side of the cutting plane of said knife and movable transversely of said plane, said gauge having a gauge surface substantially parallel to said plane and adapted to engage the edge of the material to be cut during cutting operations, said gauge surface being located in front of said knife, a screw spindle extending transversely of said cutting plane and to the rear of said knife, said screw spindle having a series of spaced annular recesses along a portion of its length, an arm fixed to said gauge and extending rearwardly along one side of said knife, a nut pivotally supported on said arm and threaded on said spindle, a fixed slide bearing, a slide rod connected to said arm and extending through said bearing, and a locking plate fixed to said slide bearing and having a clevis portion adapted to extend into any one of said spindle recesses to lock said spindle against endwise movement while permitting said spindle to be rotated, said gauge being adjustably movable with respect to said cutting plane independently of said screw spindle when said spindle is angularly moved out of locking engagement with said locking plate about the pivotal support of said nut.

16. A portable machine for cutting sheet material into sections or strips comprising a rotary knife having a series of slots spaced along its periphery and extending inwardly therefrom, and means for delivery cooling liquid to the peripheral section of said knife.

17. A portable machine for cutting sheet material into sections or strips comprising a rotary knife having a series of slots spaced along its periphery and extending inwardly therefrom, said slots being inclined in the direction of rotation of said knife with respect to corresponding radial lines passing through the outer ends of respective slots, means for delivering cooling liquid to the peripheral section of said knife, and a pair of spreaders on opposite sides of said knife near the bottom thereof, made of spring plate and each having one end anchored and its other free end close to said knife, said spreaders being inclined towards said knife.

MARTIN ZAWISTOWSKI.